US010209342B2

(12) United States Patent
Miller

(10) Patent No.: US 10,209,342 B2
(45) Date of Patent: Feb. 19, 2019

(54) ELECTROMAGNETIC RADIATION SOURCE LOCATING SYSTEM

(71) Applicant: The United States of America, as represented by the Secretary of the Navy, Washington, DC (US)

(72) Inventor: Gerald F Miller, Bedford, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/870,913

(22) Filed: Jan. 13, 2018

(65) Prior Publication Data

US 2018/0196122 A1 Jul. 12, 2018

Related U.S. Application Data

(62) Division of application No. 13/608,588, filed on Sep. 10, 2012, now Pat. No. 9,874,625, which is a division
(Continued)

(51) Int. Cl.
*G01S 5/04* (2006.01)
*G01S 17/02* (2006.01)
(Continued)

(52) U.S. Cl.
CPC .................. *G01S 5/04* (2013.01); *G01S 5/16* (2013.01); *G01S 11/04* (2013.01); *G01S 17/023* (2013.01);
(Continued)

(58) Field of Classification Search
CPC ... G01S 5/04; G01S 5/16; G01S 11/04; G01S 17/023; G01S 17/026;
(Continued)

(56) References Cited

U.S. PATENT DOCUMENTS 3,689,842 A 9/1972 Meed
4,393,382 A 7/1983 Jones
(Continued)

FOREIGN PATENT DOCUMENTS

EP 0603003 6/1994
GB 2064257 6/1981
WO WO-2008029812 A1 * 3/2008 .............. G01S 11/02

OTHER PUBLICATIONS

K. Walchko et al., Embedded Low Cost Inertial Navigation System, Florida Conference on Recent Advances in Robotics (FCRAR), May 2003.
(Continued)

*Primary Examiner* — Bernarr E Gregory
*Assistant Examiner* — Fred H Mull
(74) *Attorney, Agent, or Firm* — Christopher A. Monsey

(57) ABSTRACT

An electromagnetic radiation source locating system including an electromagnetic radiation sensor including an antenna configured to detect a radiant energy transmission. A position detector is in communication with the controller and is configured to detect the position of the antenna relative to a reference coordinate system, while an orientation sensor is in communication with the controller and is configured to detect the orientation of the antenna and provide an orientation signal to the controller. A range sensor is configured to detect the distance to an aligned object in the path of a directional vector and provide a distance signal indicative thereof to the controller. An aerial vehicle may be in communication with the controller and configured to drop a marker for guiding navigators to the source of the radiant energy transmission.

14 Claims, 8 Drawing Sheets

Related U.S. Application Data of application No. 12/363,365, filed on Jan. 30, 2009, now Pat. No. 8,264,409.

(51) Int. Cl.
*G01S 11/04* (2006.01)
*G01S 17/08* (2006.01)
*G01S 5/16* (2006.01)
*G01S 17/10* (2006.01)
*G01S 19/13* (2010.01)

(52) U.S. Cl.
CPC ............ *G01S 17/026* (2013.01); *G01S 17/08* (2013.01); *G01S 17/10* (2013.01); *G01S 19/13* (2013.01)

(58) Field of Classification Search
CPC ......... G01S 17/08–17/10; G01S 19/13–19/15; G01S 9/17–9/18; G01S 5/14; G01S 11/042

See application file for complete search history.

(56) References Cited

U.S. PATENT DOCUMENTS

| | | | |
|---|---|---|---|
| 4,642,649 A | 2/1987 | Lightfoot | |
| 5,969,676 A | 10/1999 | MyTran et al. | |
| 5,977,958 A | 11/1999 | Baron et al. | |
| 6,034,634 A * | 3/2000 | Karlsson ................. | H01Q 3/08 342/359 |
| 6,054,950 A | 4/2000 | Fontana | |
| 6,222,464 B1 | 4/2001 | Tinkel et al. | |
| 6,249,252 B1 | 6/2001 | Dupray | |
| 6,639,553 B2 | 10/2003 | Lin et al. | |
| 6,671,622 B2 | 12/2003 | McCall et al. | |
| 6,707,424 B1 | 3/2004 | Snyder et al. | |
| 6,806,828 B1 | 10/2004 | Sparrow et al. | |
| 7,498,986 B2 | 3/2009 | Thomas | |
| 9,562,830 B2 | 2/2017 | Liu | |
| 2002/0070862 A1 | 6/2002 | Francis et al. | |
| 2004/0021569 A1 | 2/2004 | Lepkofker et al. | |
| 2004/0029558 A1* | 2/2004 | Liu ........................... | G01S 5/04 455/404.2 |
| 2005/0122252 A1 | 6/2005 | Xu et al. | |
| 2006/0126801 A1 | 6/2006 | Laperi | |
| 2006/0255951 A1 | 11/2006 | Roeder et al. | |
| 2006/0267841 A1* | 11/2006 | Lee .......................... | G01S 5/14 342/463 |
| 2007/0000991 A1 | 1/2007 | Matsen et al. | |
| 2007/0018890 A1 | 1/2007 | Kulyukin | |
| 2007/0042716 A1 | 2/2007 | Goodall et al. | |
| 2008/0086241 A1 | 4/2008 | Phillips et al. | |
| 2008/0129600 A1 | 6/2008 | Thomas | |
| 2008/0195261 A1 | 8/2008 | Breed | |
| 2008/0207357 A1 | 8/2008 | Savarese et al. | |
| 2008/0218404 A1 | 9/2008 | Ma et al. | |
| 2009/0021424 A1 | 1/2009 | Wahlberg et al. | |
| 2010/0207820 A1* | 8/2010 | Kawano ................. | G01S 11/02 342/393 |

OTHER PUBLICATIONS

R. Fernandez-Recio et al., Estimation of DOA Using an Array of Yagi Antennas in the UHF Band Using an Interpolation Technique, URSI International Symposium on Electromagnetic Theory, May 2004.

Thermal Imaging. (2014). In M.Clugston,The Penguin Dictionary of Science. London, United Kingdom: Penguin. Retrieved from http://search.credoreference .com/content/entry /penguinscience/thermal_imaging/O.

Aero Vironment RQ-14 Dragon Eye/Swift, Directory of U.S. Military Rockets and Missiles Appendix 2 :Modern UAVs, Jul. 25, 2007 3 pgs.

Tektronix Communications , Signal Hunting and Classification,Tektronix Communications, Apr. 2008, available at ww\v.tektronix.com/RFHawk, 12 pgs. Beaverton, Oregon.

Tektronix Communications, RFHawk Signal Hunter, Jul. 2008, available at www.tektronix.com!R.FHawk, 12 pgs. Beaverton, Oregon.

PM Soldier Equipment, Small Tactical Optical Rifle Mounted (STORI\1) Micro-Laser Rangefmder (MLRF), An/PSQ-23, Oct. 2008, 1pg.

Tektronix Communications, Tektronix Launches H600 RFIIawk(TM) Signal Hunter,Feb. 26, 2008, 2 pgs. Richardson, Texas.

Lite Machines Corporation, Voyeur, also available at w•ww.litemachines.com 6 pgs., at least asearly as Apr. 10, 2008, West Lafayette, Indiana.

Optical Alchemy, "KJ-640 Inertially Stabilized & Geo Referenced Gimbal," Rev. 5, 1 page, at least as early as Jan. 30, 2009, Nashua, NH.

* cited by examiner

ELECTROMAGNETIC RADIATION SOURCE LOCATING SYSTEM

CROSS-REFERENCE TO RELATED APPLICATION

This application is a divisional of U.S. patent application Ser. No. 13/608,588, filed Sep. 10, 2012, now U.S. Pat. No. 9,874,625, entitled ELECTROMAGNETIC RADIATION SOURCE LOCATING SYSTEM, the disclosure of which is related to U.S. patent application Ser. No. 12/363,365, filed Jan. 30, 2009, and now U.S. Pat. No. 8,264,409, entitled ELECTROMAGNETIC RADIATION SOURCE LOCATING SYSTEM, the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,479) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND OF THE INVENTION

The present invention relates generally to systems for locating electromagnetic radiation sources, such as radio frequency (RF) signal sources.

Radio frequency detectors are known in the art for passively detecting radio frequency signal sources. For instance, radio frequency signal hunters exist for detecting signal sources based upon detected signal strength. Radio frequency interferometers have also been used to receive RF signals on a linear array of sensors in order to calculate a spatial relationship between the array sensors and the source of RF energy.

However, the need exists for an efficient, comprehensive, and dependable locating system to clearly locate, identify, and mark an RF signal source. Exemplary applications of such a locating system include identifying rogue or interfering RF signal sources, and tracking down RF signal sources, such as cellular phone signals. Such a locating system may find particular use in a variety of circumstances, for example, in the telecommunication industry for locating RF signal sources interfering with cellular phone towers. Such a locating system may also find use by rescue personnel to track down a user in distress, for example, an individual involved in an automobile crash in a remote area or lost in a sparsely inhabited area where cell towers are far between, and target signals may be weak or masked.

SUMMARY OF THE INVENTION

According to an illustrative embodiment of the present disclosure, an electromagnetic radiation source locating system includes an electromagnetic radiation sensor having an antenna configured to detect a radiant energy transmission. A controller is in communication with the electromagnetic radiation sensor. A support is operably coupled to the electromagnetic radiation sensor for supporting the antenna in a plurality of orientations relative to the radiant energy transmission. A position detector is in communication with the controller, and is configured to detect the translational position of the antenna relative to a reference coordinate system and provide a position signal indicative thereof to the controller. An orientation detector is in communication with the controller, and is configured to detect the rotational orientation of the antenna and provide an orientation signal indicative thereof to the controller. The controller is configured to determine a directional vector to a source of the radiant energy transmission in response to the orientation signal. A range sensor is in communication with the controller, and is configured to detect a distance to an aligned object in the path of the directional vector and provide a distance signal indicative thereof to the controller.

According to another illustrative embodiment of the present disclosure, a radio frequency source locating system includes a directional antenna configured to receive radio frequency signals. A radio frequency signal processor is operably coupled to the antenna. A support is configured to be mounted to a vehicle and is operably coupled to the antenna. An actuator is configured to rotate the directional antenna about at least two perpendicular axes. A controller is in communication with the radio frequency signal processor and is configured to cause the actuator to orient the antenna in a direction based upon the strength of the radio frequency signals. A position detector is in communication with the controller, and is configured to detect the translational position of the directional antenna relative to a reference coordinate system and to provide a position signal indicative thereof to the controller. An orientation detector is in communication with the controller, and is configured to detect the rotational orientation of the directional antenna and provide an orientation signal indicative thereof to the controller. The controller is configured to determine a directional vector to a source of the radio frequency signals in response to the orientation signal.

According to a further illustrative embodiment of the present disclosure, an electromagnetic radiation source locating system includes an electromagnetic radiation sensor having a collector configured to detect a radiant energy transmission. A controller is in communication with the electromagnetic radiation sensor. A support is operably coupled to the electromagnetic radiation sensor and is configured to orient the collector of the electromagnetic radiation sensor in a direction toward the strongest radiant energy transmission detected by the collector. A position detector is in communication with the controller, and is configured to detect the translational position of the collector of the electromagnetic radiation sensor relative to a reference coordinate system and provide a position signal indicative thereof to the controller. An orientation detector is in communication with the controller and is configured to detect the rotational orientation of the collector of the electromagnetic radiation sensor and provide an orientation signal indicative thereof to the controller. The controller is configured to determine a directional vector to a source of the radiant energy transmission in response to the orientation signal. The controller includes a spatial processor configured to calculate the location of the radiant energy transmission source based upon at least two different directional vectors. An aerial vehicle is in communication with the controller, and a marker is configured to be dropped by the aerial vehicle on the calculated location of the radiant energy transmission source.

According to yet another illustrative embodiment of the present disclosure, an electromagnetic radiation source locating system includes a first vehicle, a first electromagnetic radiation receiving device supported by the first vehicle and configured to detect a radiant energy transmission. A first directional antenna is operably coupled to the receiving device. A first support is operably coupled to the first electromagnetic radiation receiving device for orienting the first directional antenna in a direction toward the radiant energy transmission. A first position detector is in communication with the controller and is configured to detect the position of the first directional antenna relative to a reference coordinate system. A first orientation detector is in communication with the controller and configured to detect the orientation of the first directional antenna and provide a directional signal indicative thereof to the controller. The electromagnetic radiation source locating system further includes a second vehicle, and a second electromagnetic radiation receiving device supported by the second vehicle and configured to detect a radiant energy transmission. A second directional antenna is operably coupled to the receiving device. A second support is operably coupled to the second electromagnetic radiation receiving device for orienting the second directional antenna in a direction toward the radiant energy transmission. A second position detector is configured to detect the position of the second directional antenna relative to the reference coordinate system. A second direction detector is in communication with the controller and is configured to detect the orientation of the second directional antenna and provide a directional signal indicative thereof to the controller. A controller is configured to determine a directional vector to the radiant energy transmission source. The controller includes a spatial processor configured to calculate the location of the radiant energy transmission source based upon at least two different directional vectors.

According to a further illustrative embodiment of the present disclosure, a method of detecting a transmission source of electromagnetic radiation, includes the steps of positioning a directional antenna at a first location, detecting an electromagnetic signal at the first location with the directional antenna, and aligning the directional antenna at the first location based upon the strength of the detected electromagnetic radiation signal. The method further includes the steps of directing a light source from the first location in the direction of the aligned directional antenna, positioning a directional antenna at a second location, and detecting an electromagnetic signal at the second location with the directional antenna. The method further includes the steps of aligning the directional antenna at the second location with based upon the strength of the detected electromagnetic radiation signal, and directing a light source from the second location in the direction of the aligned directional antenna. The method further includes the steps of calculating the expected intersection point of the light source from the first location and the light source from the second location.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Figure 1:
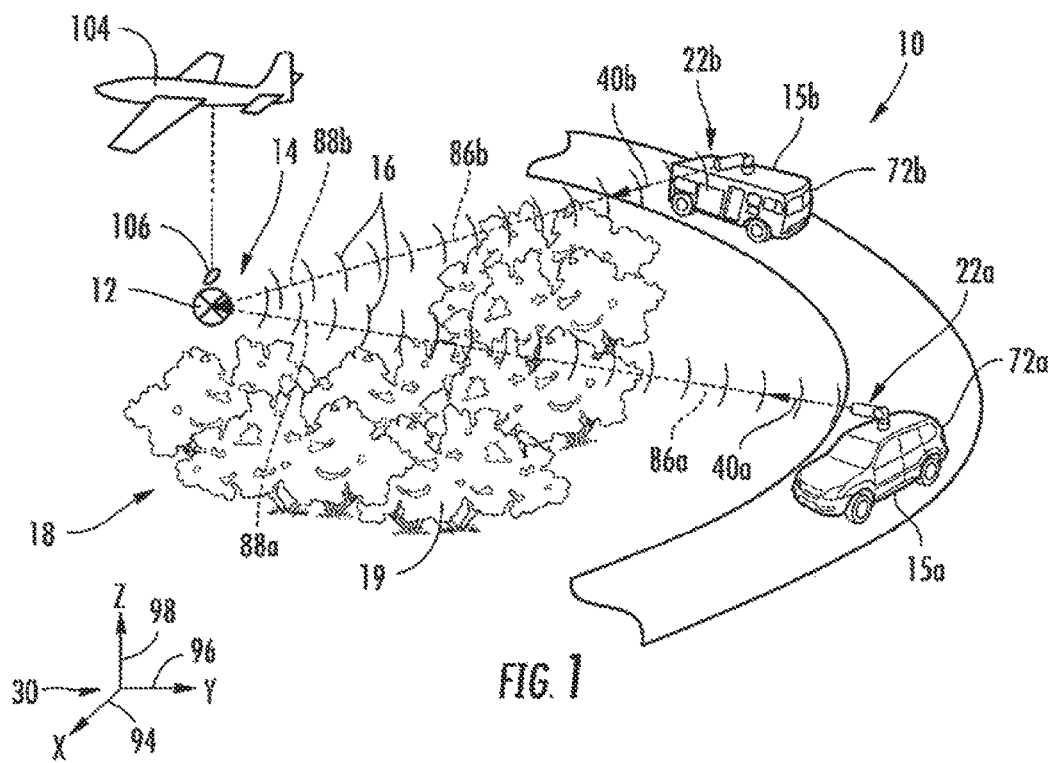
FIG. 1 is a diagrammatic view showing an illustrative embodiment electromagnetic radiation source locating system for locating a transmission source at least partially hidden by an obstruction.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

With reference initially to FIGS. 1-4, the electromagnetic radiation source locating system 10 of the present disclosure is configured to detect, categorize, and locate the source 12 of a radiant energy transmission 14 from at least one data acquisition location 15. As used within the following description, each data acquisition location will be identified with the reference number 15 followed by a letter (i.e., 15a, 15b, etc.). Also, as used herein, electromagnetic radiation is considered to be made up of oscillating electric and magnetic fields, is propagated with the speed of light, and includes gamma radiation, X-rays, ultraviolet, visible, and infrared radiation, and radar and radio waves. In the illustrative embodiment, the electromagnetic radiation source 12 illustratively comprises a radio frequency transmitter, such as a two-way radio or cellular telephone, emitting a radio frequency (RF) signal 16. As known, radio frequency waves are generally considered to be within a frequency range from about 3 kHz to about 300,000 MHz. However, it should be appreciate that the system 10 of the present invention is not limited to such a range of the electromagnetic spectrum and may be used to detect other sources of electromagnetic radiation.

Figure 2:
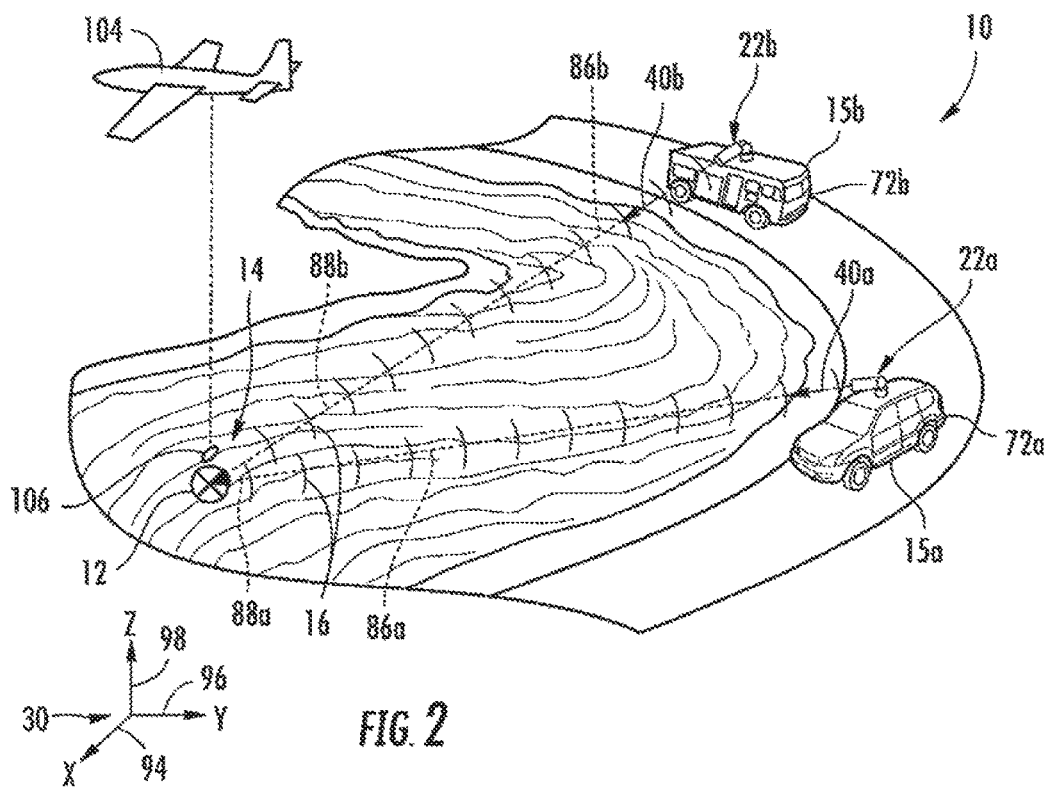
FIG. 2 is a diagrammatic view similar to FIG. 1, showing a transmission source at an elevation below the electromagnetic radiation source locating system.
Figure 3:
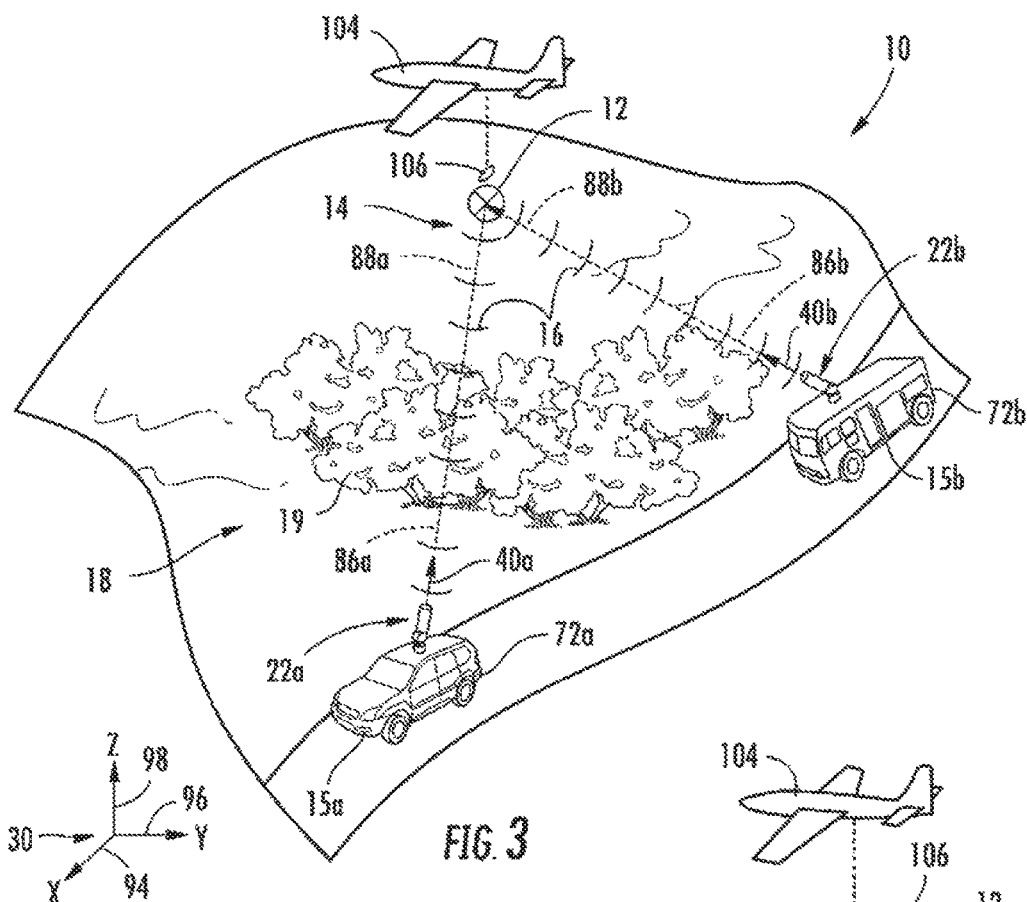
FIG. 3 is a diagrammatic view similar to FIG. 1, showing a transmission source at an elevation above the electromagnetic radiation source locating system and at least partially hidden by an obstruction.
Figure 4:
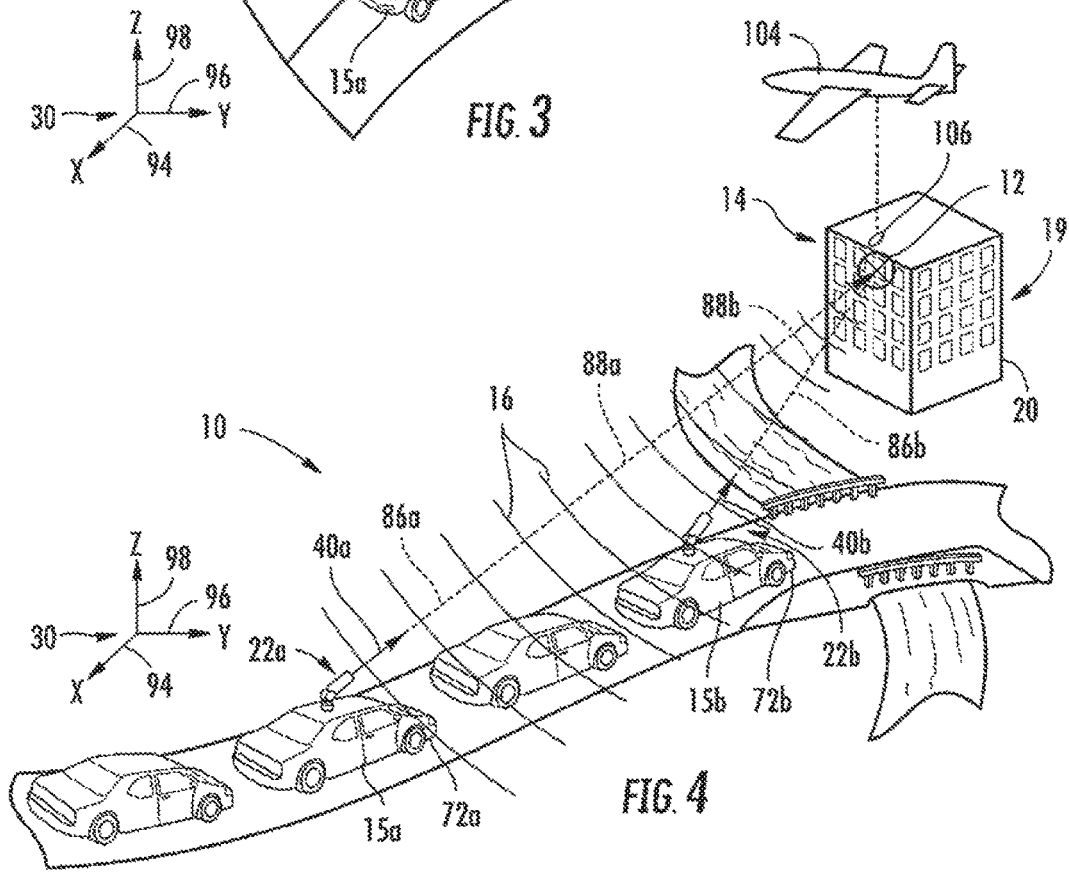
FIG. 4 is a diagrammatic view showing an illustrative electromagnetic radiation source locating system for locating a transmission source positioned within a structure.

As further detailed herein, FIG. 1 illustrates the use of the locating system 10 wherein an obstruction 18 (in the form of a wooded area 19) exists intermediate the locating system 10 and the signal transmission source 12. More particularly, the wooded area 19 at least partially obstructs the view of the electromagnetic radiation source 12 from the data acquisition locations 15a and 15b. FIG. 2 shows the electromagnetic radiation source 12 at a lower elevation than the locating system 10, while FIG. 3 shows the electromagnetic radiation source 12 at a higher elevation than the locating system 10. FIG. 4 illustrates the combination of different elevations between the signal transmission source 12 and the locating system 10 and an obstruction 18 (in the form of a building 20) positioned there between.

Figure 5:
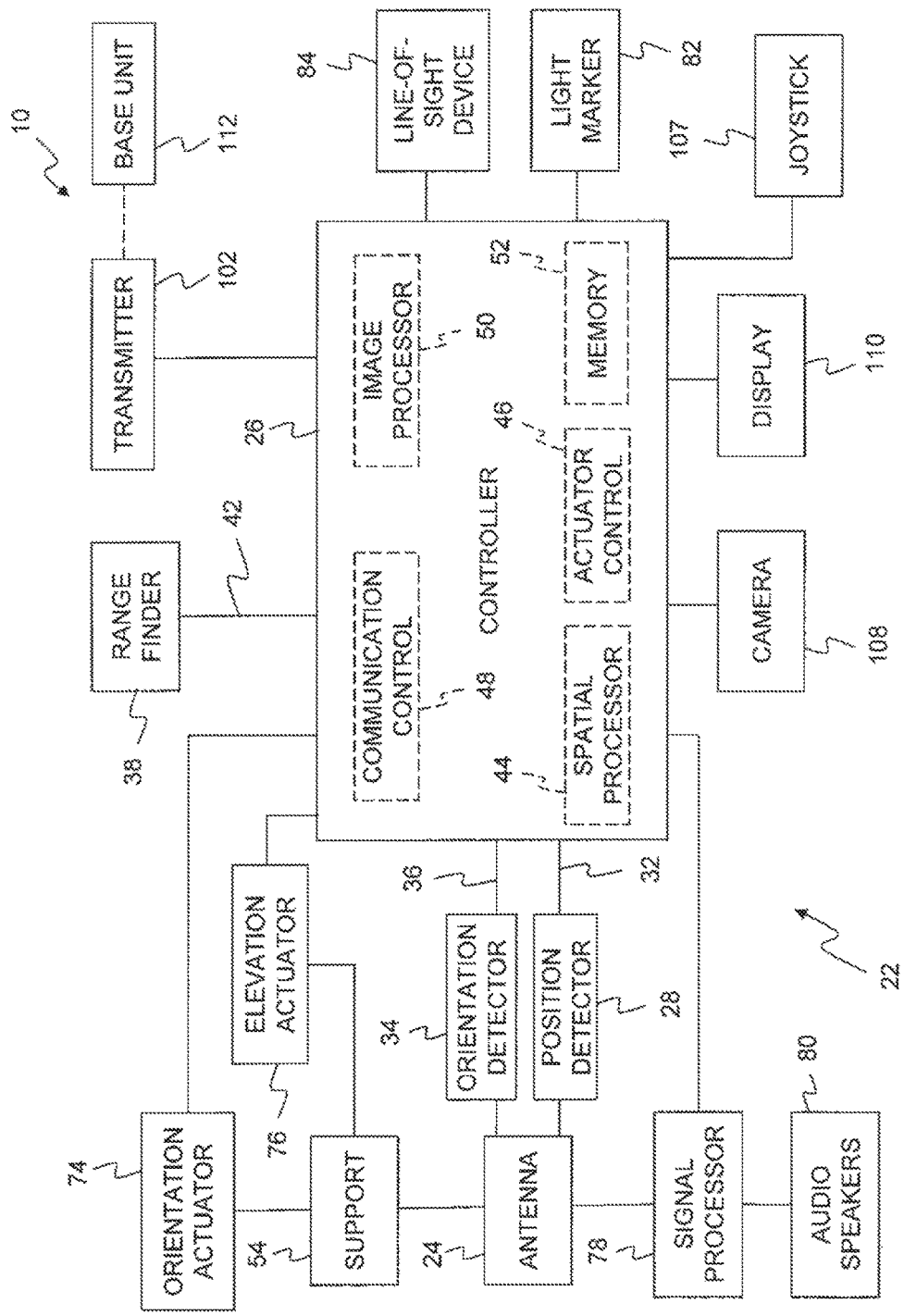
FIG. 5 is a block diagram illustrating communication between various components of the illustrative electromagnetic radiation source locating system.
Figure 6:
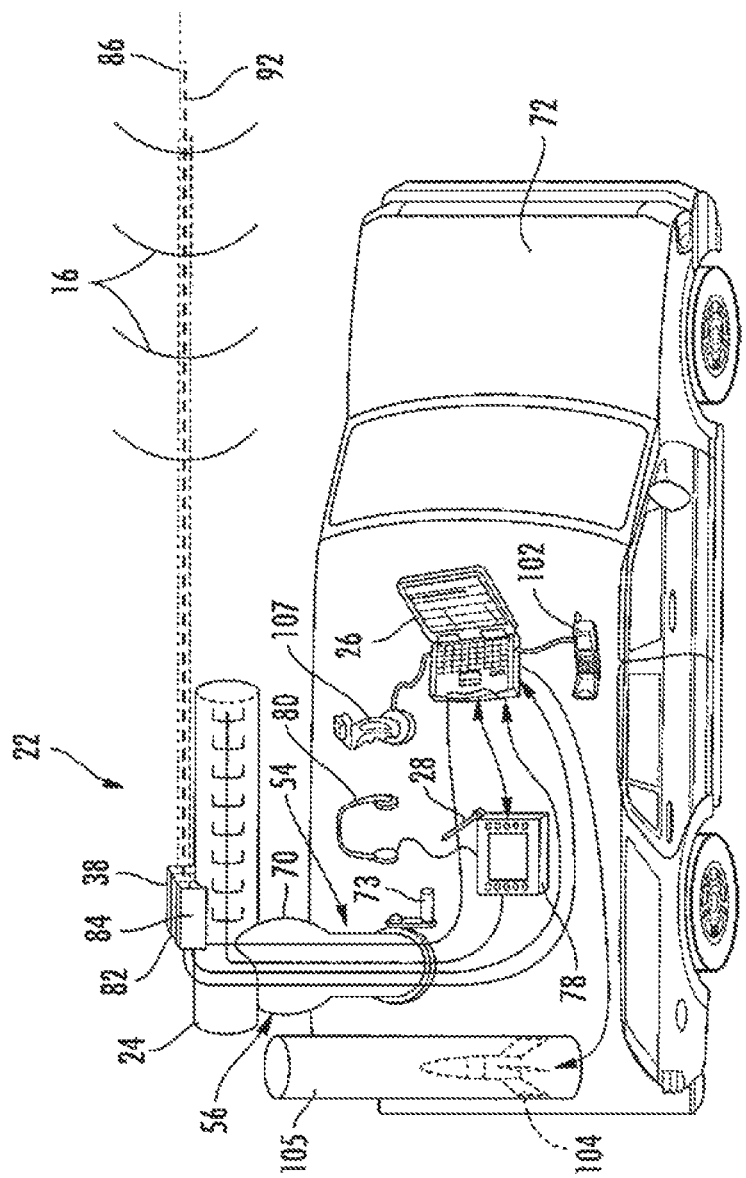
FIG. 6 is a perspective view, in partial schematic, of the illustrative electromagnetic radiation source locating system of FIG. 5 supported within a vehicle.

According to the illustrative embodiment of FIGS. 5 and 6, the electromagnetic radiation source locating system 10 includes an electromagnetic radiation sensor assembly 22 including an antenna 24 configured to detect radiant energy transmission 14, illustratively RF signal 16. A controller 26 is in communication with the electromagnetic radiation sensor assembly 22.

The electromagnetic radiation sensor assembly 22 further includes a position detector 28 in communication with the controller 26 and configured to detect the translational position of the antenna 24 relative to a reference coordinate system 30 (FIGS. 1-4) and provide a position signal 32 indicative thereof to the controller 26. An orientation detector 34 is also in communication with the controller 26 and is configured to detect the rotational orientation of the antenna 24 and provide an orientation signal 36 indicative thereof to the controller 26. A range sensor or finder 38 is in communication with the controller 26 and is configured to detect the distance to an aligned object in the path of a directional vector 40 calculated by the controller 26 and to provide a distance signal 42 indicative thereof to the controller 26.

The controller 26 may include a variety of processors or computing elements configured to manipulate input and produce a desired output. As further detailed herein, these various processors may include a spatial processor 44, an actuator control 46, a communication control 48, and an image processor 50. The controller 26 may also include a memory 52 for storing various data for subsequent manipulation by the various processors. In certain illustrative embodiments, the controller 26 may comprise a mobile or laptop computer.

The antenna 24 of the illustrative system comprises a directional or beam antenna. As is known, a directional antenna focuses RF energy in a particular direction providing for increased performance in transmitting and receiving, and reducing interference from unwanted signal sources. In the illustrative embodiment, the antenna 24 comprises a Yagi antenna including an array of a dipole and additional closely coupled parasitic elements, usually a reflector and one or more directors (not shown).

Figure 7:
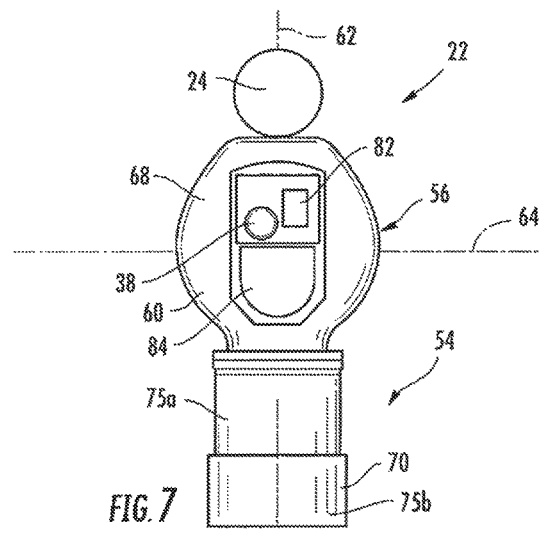
FIG. 7 is a front view of an illustrative sensor assembly of the electromagnetic radiation source locating system as coupled to a vehicle.
Figure 8:
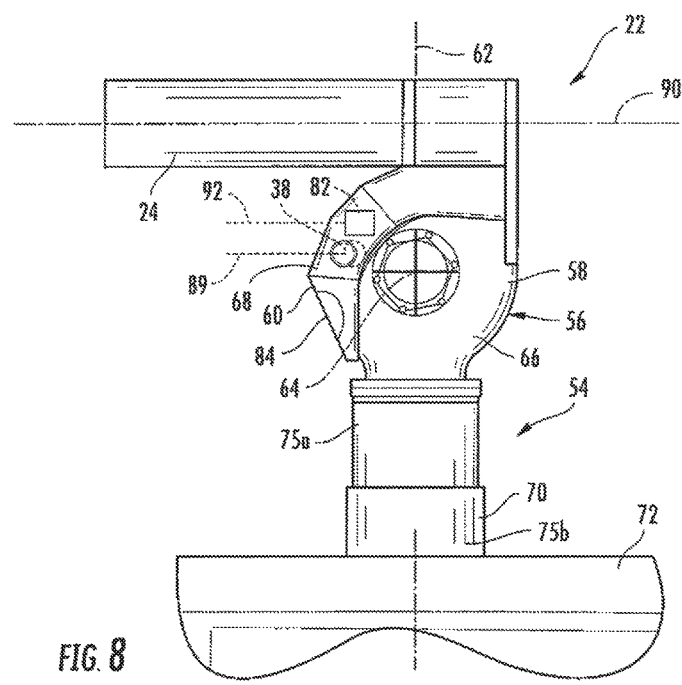
FIG. 8 is a side elevational view of the illustrative sensor assembly of FIG. 7.

The antenna 24 is illustrative operably coupled to a support 54. As shown in FIGS. 7 and 8, the support 54 may include a spherical member or ball turret 56 including a pair of gimbals 58 and 60. The gimbals 58 and 60 provide for rotation of the spherical member 56 about two perpendicular axes 62 and 64. More particularly, gimbal 58 includes a base portion 66 configured to rotate about a substantially vertical axis 62. Gimbal 60 includes a cap portion 68 supported by the base portion 66 configured to rotate about a substantially horizontal axis 64.

The base portion 66 of spherical member 56 is illustratively rotatably coupled to a mast 70 which, in turn, is coupled to a vehicle 72. An orientation actuator 74 (FIG. 5) is operably coupled to the spherical member 56 and is configured to cause rotation thereof, and hence of the antenna 24, about the axes 62 and 64. The actuator control 46 of the controller 26 is in communication with the orientation actuator 74 for controlling movement thereof. The orientation actuator 74 may be of conventional design, such as a pair of electric servo-motors or hydraulic rotary motors (not shown). A manual input 73, such as a hand crank, may be provided as an override to the orientation actuator 74. Illustratively, the manual input 73 may be used to fine tune to positioning of the antenna 24 following adjustment by the actuator 74, for example to align the antenna 24 in the direction of the strongest detected signal 16.

In one illustrative embodiment, the mast 70 may be raised or lowered by an elevation actuator 76 (FIG. 5), illustratively an electric motor coupled to a rack and pinion, or a hydraulic cylinder (not shown). As shown in FIGS. 7 and 8, the mast 70 may be formed of telescoping members 75a and 75b to provide a compact arrangement when in a lowered position. The actuator control 46 of the controller 26 is in communication with the elevation actuator 76 for controlling operation thereof.

With further reference to FIGS. 1 and 5, the antenna 24 is in communication with a signal processor 78. The signal processor 78 may be separate from or integrated with the controller 26 and is configured to analyze, interpret, and manipulate the detected RF signals 16. Processing of the RF signals 16 may include filtering, storage and reconstruction, separation of information from noise, and feature extraction. In one illustrative embodiment, the signal processor 78 identifies and classifies the detected RF signals 16. More particularly, the signal processor 78 may be utilized by the controller 26 to determine the relative strengths of signals 16 based upon different orientations of the antenna 24. In one illustrative embodiment, an audio speaker 80, such as headphones, may be provided to generate an audible signal to the user that varies depending upon the strength of the detected signal 16. One illustrative signal processor 78 that may be used with the locating system 10 is the H600 RFHawk Signal Hunter available from Tektronix Communications of Richardson, Tex.

The cap portion 68 of spherical member 56 may also support range finder 38, a light marker 82, and a line-of-sight device 84. Illustratively, the range finder 38 is in communication with the controller 26 and is configured to measure distance from the observer to a target. The range finder 38 may be a laser range finder configured to transmit a laser pulse 86 and determine distance to an aligned object based upon the return pulse 88 as reflected off the aligned object (which could be an obstruction 18, such as woods 19 in FIGS. 1 and 3). In one illustrative embodiment, the longitudinal axis 89 of the laser range finder 38 extends parallel to the longitudinal axis 90 of the antenna 24 such that the laser pulse 86 is coaxial therewith.

The light marker 82 may also include a laser configured to transmit an infrared beam 92 (FIGS. 6 and 8) parallel to the longitudinal axis 90 of the antenna 24. As such, the beam 92 may be used to mark a target aligned with the antenna 24. The light marker 82 is illustratively night vision goggle (NVG) capable for viewing in dark or low light conditions with proper night vision equipment. More particularly, the line-of-sight device 84 may be night vision capable and illustratively comprises an infrared spotting scope configured to detect the infrared beam 92 emitted from the light marker 82. In other instances, a camera may define the line-of-sight device 84.

The position detector 28 illustratively comprises a global positioning system (GPS) receiver configured to detect the absolute position of the antenna 24 relative to reference coordinate system 30. The reference coordinate system 30 illustratively comprises a geographic coordinate system wherein each coordinate is expressed as an x, y, z (Cartesian) coordinate. In other words, position may be represented by a conventional three axis coordinate system including an x-axis 94 corresponding to latitude, a y-axis 96 corresponding to longitude, and a z-axis 98 corresponding to elevation.

As is known, the GPS receiver 28, through its antenna (FIG. 6), receives signals sent by a constellation of GPS satellites (not shown) orbiting the earth. Each satellite continually transmits signals including the time the signal was sent and the orbit for the satellite transmitting the signal. The controller 26 uses the arrival time of each signal to calculate the distance to each satellite, from which it determines the position of the antenna 24. More particularly, the controller 26 may determine x, y, and z coordinates (corresponding to latitude, longitude and elevation) of the antenna 24 from the signals received by the position detector 28. When the position detector 28 determines the absolute position of the antenna 24 along the respective coordinate axes 94, 96, and 98, it sends position signal 32 containing such information to the controller 26. In the illustrative embodiment of FIG. 5, the GPS receiver 28 is an independent component communicating with the controller 26. However, in FIG. 6, the GPS receiver 28 is integrated within the signal processor 78. In other illustrative embodiments, the GPS receiver 28 may be incorporated within other components, such as the controller 26.

The orientation detector 34 is illustratively configured to detect the angular orientation of the antenna 24 about the perpendicular axes 62 and 64 relative to the reference coordinate system 30. Moreover, the orientation detector 34 transmits orientation signal 36 to the controller 26 proportional to its orientation relative to the reference coordinate system 30. Illustratively, the orientation detector 34 may comprise a digital compass operably coupled to the support 54. In an alternative illustrative embodiment, the orientation detector 34 may comprise angular or rotation sensors configured to sense the rotational movement of the antenna 24 relative to the support 54. In one embodiment, these rotation sensors may comprise feedback elements integral with orientation actuators 76, such as servomotors, configured to rotate the antenna 24.

The spatial processor 44 of controller 26 manipulates data from the position signal 32 transmitted by the position detector 28 and from the orientation signal 36 transmitted by the orientation detector 34 to calculate the position of the signal transmission source 12. More particularly, the controller 26 determines directional vectors 40a and 40b (FIGS. 1-4) at data acquisition locations 15a and 15b based upon the data from position signal 32 and orientation signal 36.

Figure 9:
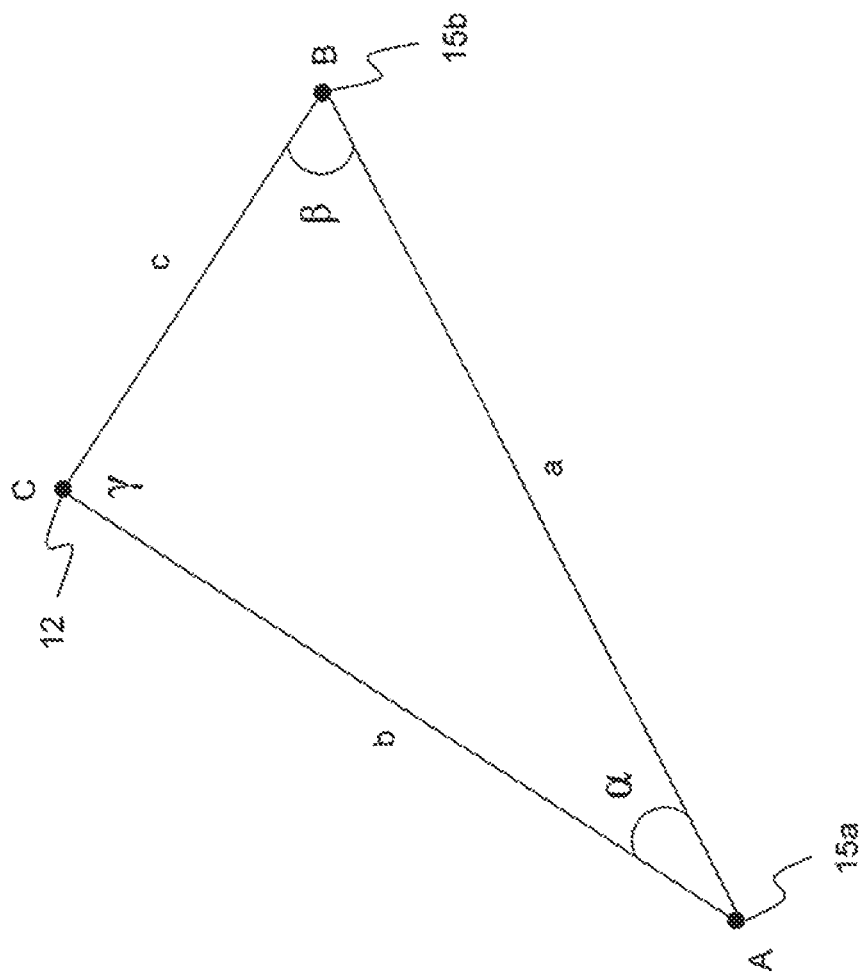
FIG. 9 is a diagrammatic view demonstrating illustrative calculations used by the spatial processor of the controller of the electromagnetic radiation source locating system.

With reference to FIG. 9, the coordinates of a first location A of antenna 24 (corresponding to data acquisition location 15a) are sensed by position detector 28a and stored in memory 52 of controller 26. Likewise, the coordinates of a second location B of antenna 24 (corresponding to data acquisition location 15b) are sensed by position detector 28b and stored in memory 52 of controller 26. Finally, the orientation of the antenna 24a and 24b at first and second locations A and B are also known by orientation detector 34a and 34b. It should be appreciated that the position signals 32 and orientation signals 36 from first and second locations A and B may be contemporaneously acquired by sensors 22a and 22b of spatially distinct systems 10a and 10b, or acquired successively at distinct times by a single system 10 moved from position A to position B. Further, any number of readings may be acquired at any number of data acquisition locations 15.

The spatial processor 44 uses trigonometry, and more particularly, triangulation to determine the location of the signal transmission source 12 from data acquired by the locating system 10 at first and second data acquisition locations 15a and 15b. Triangulation is the known process of determining the location of an unknown point by measuring angles to it from known points at either end of a fixed baseline, rather than measuring distances from the known points to the unknown point directly. The distance to, and hence the coordinates of, an unknown point may be found by calculating the length of one side of a triangle, given measurements of angles and sides of the triangle formed by that point and two other known reference points. The following equations apply in flat or Euclidean geometry, such that inaccuracies may develop if distances become appreciable compared to the curvature of the Earth. As such, these equations may be replaced with others derived using spherical trigonometry.

While different known trigonometric relationships may be utilized by the spatial processor 44, the following equations show one illustrative embodiment in connection with representative FIG. 8. The distance "b" from point A to point C, and the distance "c" from point B to point C, may be calculated by using the distance "a" from point A to point B. More particularly, the spatial processor 44 may use the law of sines for calculating the lengths of the sides of a triangle:

$$\frac{\sin\alpha}{c} = \frac{\sin\beta}{b} = \frac{\sin\gamma}{a}$$

Since the distance "a" is known (from the position signals taken at acquisition points 15a and 15b), the lengths of the other two sides "b" and "c" may be calculated as:

$$b = \frac{a \cdot \sin\beta}{\sin\gamma} \text{ and } c = \frac{a \cdot \sin\alpha}{\sin\gamma}$$

Given the known values for angles $\alpha$ and $\beta$, and the known values for lengths a, b and c, the full coordinates of the unknown point C (corresponding to the electromagnetic radiation source 12) may then be calculated.

The locating system 10 further illustratively includes a transmitter 102 operably coupled to communication control 48 of the controller 26. The transmitter 102 may comprise a conventional radio frequency transmitter or form part of a transceiver for providing communication with external receivers and/or transceivers (not shown). In certain illustrative embodiments as further detailed herein, the transmitter 102 provides communication with a base unit 112 (FIG. 5) or a second locating system 10. As illustrated in FIG. 6, the transmitter 102 may comprise a satellite phone to provide two-way communication with another sensor assembly 22. The transmitter 102 may also provide communication with an aerial vehicle 104.

The aerial vehicle 104 may be a conventional airplane or unmanned aerial vehicle (UAV) configured to carry a payload. As shown in FIG. 6, the UAV 104 may be supported within a launch tube 105 coupled to the vehicle 72. Conventional propulsion means, such as pneumatics or combustion devices, may be used to launch the UAV 104 from the tube 105. The UAV 104 is directed by the controller 26 to travel to predefined coordinates. The aerial vehicle 104 is illustratively configured to carry a marker or beacon 106. Upon instruction from the controller 26, the marker 106 is dropped by the aerial vehicle 104 proximate the detected radiant energy transmission source 12. A joystick 107 may be operably coupled to the transmitter 102 to manually control flight of the UAV 104.

The marker 106 may comprise a visible beacon, such as a smoke generator or a strobe light. Alternatively, the marker 106 may comprise an electronic beacon, such as an IR beacon, that may be tracked by appropriate equipment, such as IR sensing cameras or goggles. It certain other embodiments, the aerial vehicle 104 may drop other payload instead of, or in addition to, the marker 106. Such payload may comprise survival supplies, such as food and water, or explosives.

With further reference to FIG. 5, the locating system 10 may also include camera 108 in addition to the line-of-sight device 84, such as a video or still camera. The camera 108 is in communication with image processor 50 of the controller 26, which may display the images on a display 110, download and store images within memory 52, and/or transmit the images to a base unit 112 via transmitter 102. In one illustrative embodiment, the camera 108 may be an infrared or thermal imaging camera. More particularly, the camera 108 and/or line-of-sight device 84 may determine and verify targets designated by respective range finders 38 or light markers 82 of other sensor assemblies 22.

In the illustrative embodiments shown in FIGS. 1-4, first and second vehicles 72a and 72b may be provided with nearly identical locating systems 10a and 10b, each in communication with a separate controller 26a and 26b. In certain embodiments, the locating systems 10a and 10b may both be in communication through transceivers with a single controller 26 located at base unit 112.

Figure 10:
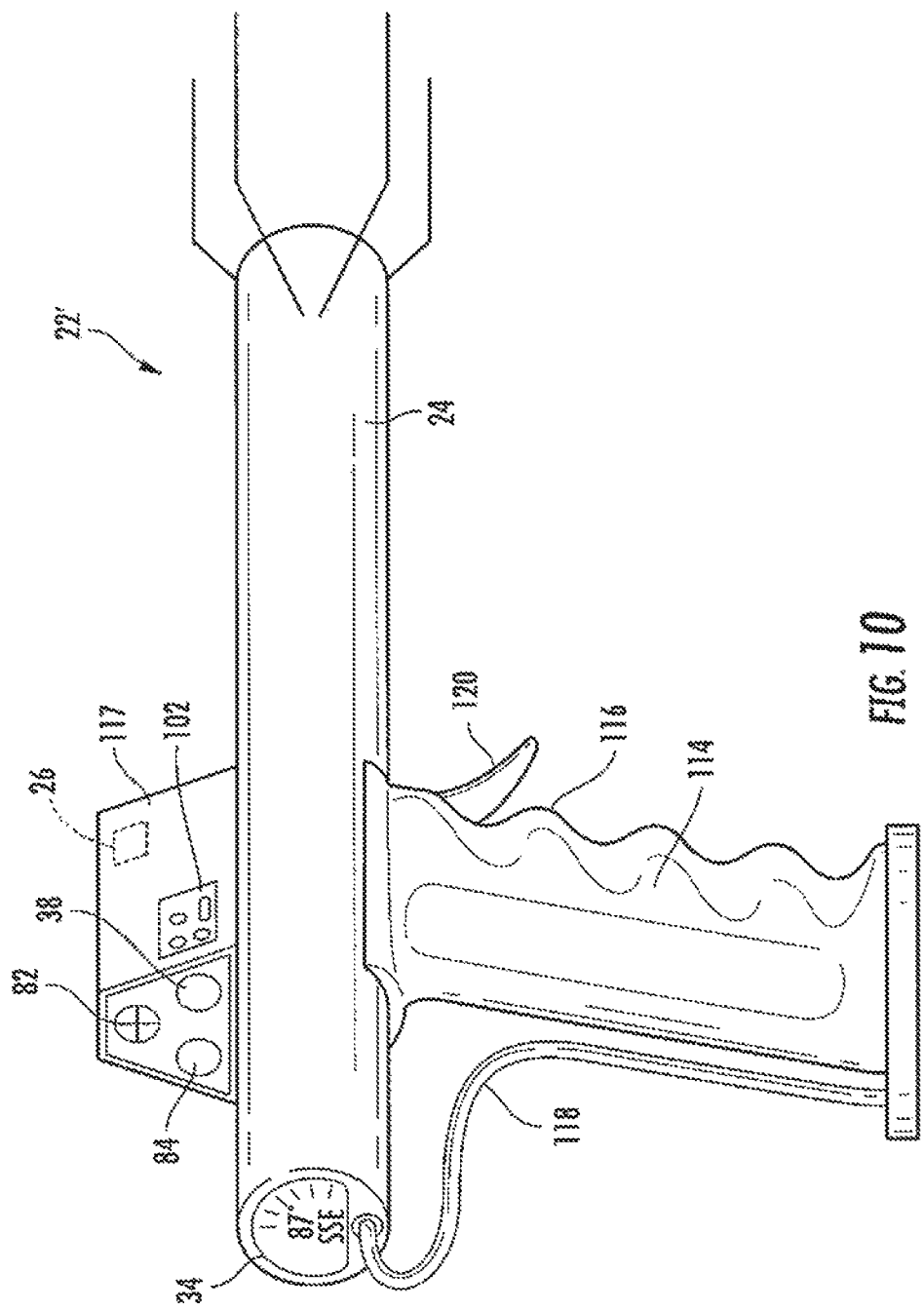
FIG. 10 is an illustrative hand held embodiment of the electromagnetic radiation source locating system.

FIG. 10 illustrates a handheld embodiment of the electromagnetic radiation sensor assembly 22'. The sensor 22' includes may similar elements to the sensor 22 illustrated in FIGS. 6-8, with like components identified with like reference numbers. However, instead of having a mast 70 mounted to a vehicle 72, the sensor 22' is configured to be carried by a user. More particularly, the antenna 24 is supported by a handle 114 including a grip portion 116 to receive the fingers of a user. An accessory housing 117 is supported by the antenna 24 and illustratively receives the range finder 38, the light marker 82, and line-of-sight device 84. Communication with the controller 26 may be through a cable 118 or wirelessly through transceiver 102. In yet other illustrative embodiments, the controller 26 may be supported within the housing 117. A two-stage trigger 120 may be supported by the handle 114 and is illustratively configured to activate the range finder 38 in a first position and activate the light marker 82 in a second position.

Figure 11:
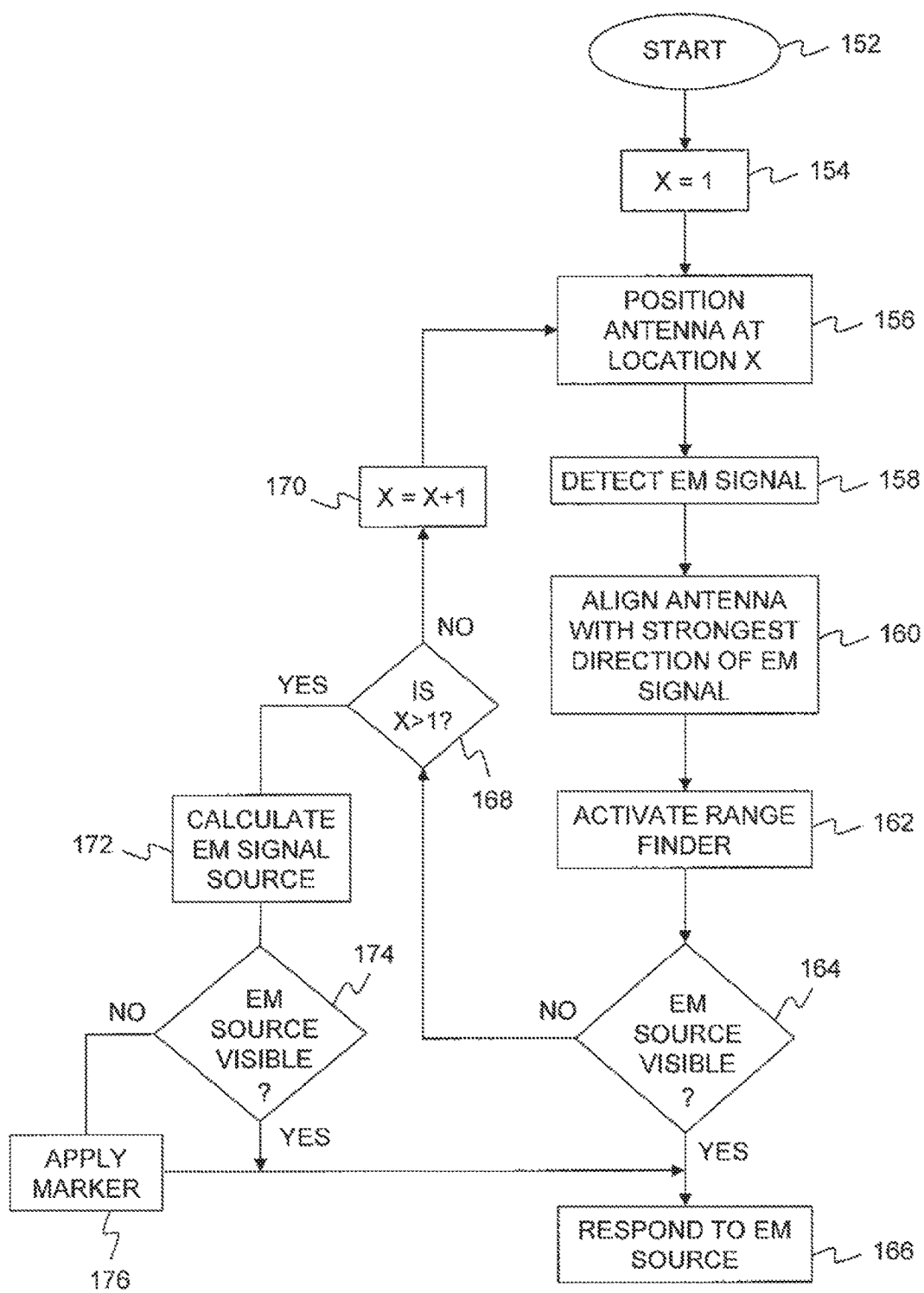
FIG. 11 flowchart showing an illustrative method of operation of the electromagnetic radiation source locating system.

With reference to FIG. 11, an illustrative method of detecting a transmission source of electromagnetic radiation begins at block 152. Next, variables are set by the controller 26, including variable "x" which is set equal to 1 at block 154. A directional antenna 24 is positioned initially at a first location 15a at block 156. More particularly, the user positions the antenna 24 at first location 15a illustratively by driving the vehicle 72 to the desired location 15a, or by walking to the desired location 15a. At block 158, the antenna 24 detects the electromagnetic radiation signal 16 at the first location 15a. The controller 26 at block 160 then aligns the directional antenna 24 at the first location 15a with the strongest detected direction of the electromagnetic radiation signal 16.

Next, at block 162, the range finder 38 directs a light from the first location 15a in the direction of the aligned directional antenna 24. A distance to an aligned object along the light beam is then returned to the range finder 38. If no obstruction 18 exists at block 164, then the RF source 14 should be visible through the line-of-sight device 84. If so, an appropriate response may be taken at block 166. If an obstruction 18 exists, such as woods or ground clutter 19, then the RF source 14 may not be visible through the line-of-sight device 84. If the RF signal source 12 cannot be viewed at block 164, then the process continues to block 168. If the number of data acquisition points 15 is not greater than 1 (i.e. x=1), then at block 170 the value of x is increased by 1 and the process returns to block 156. At block 156 the antenna 24 is repositioned to a second data acquisition point 15b. The process then continues through process blocks 158, 160, and 162 as detailed above. More particularly, the directional antenna 24 detects the electromagnetic signal 16 at second location 15b. The directional antenna 24 is then aligned at the second location 15b with the strongest detected direction of electromagnetic radiation signal 16. Light source from the range finder 38 is then directed in alignment with the antenna 24 in the direction toward the RF source 12. At block 164, again the query is posed regarding the visibility of the RF signal source 12. If visible from location 15b, then a response to the RF signal source 12 is made. If not, then the process continues to decision block 168. Since the signal source 12 has been detected from two different data acquisition points 15a and 15b (i.e. x>1), the process continues to process block 172.

Next, at block 172 the controller 26 calculates the expected intersection point of the light sources from the first and second locations 15a and 15b, which should correspond to the RF source 12. More particularly, the spatial processor 44 illustratively uses triangulation to calculate the coordinates of RF source 12 based upon the known locations of data acquisition points 15a and 15b in the manner detailed above in connection with FIG. 8.

If the light beam reflected back to the range finder 38 at point 15b does not intersect the light beam reflected back to the range finder 38 at point 15a, then the controller 26 identifies an obstruction 18 intermediate the detector 22 and the RF source 12. At block 176, the controller 24 may dispatch an aerial vehicle 104 to drop a marker 106 at the RF source 12. The marker 106 then may be utilized by ground crews to locate the RF source 12.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An electromagnetic radiation source locating system comprising:
   a first mobile structure and a second mobile structure;
   wherein said first mobile structure comprises:
      a first electromagnetic radiation receiving device configured to detect a radiant energy transmission;
      a first directional antenna operably coupled to the first electromagnetic radiation receiving device;
      a first support operably coupled to the first electromagnetic radiation receiving device for orienting the first directional antenna in a direction toward the radiant energy transmission;
      a first controller;
      a first position detector in communication with the first controller and configured to detect a location of the first directional antenna relative to a reference coordinate system and output a first position data;
      a first orientation detector in communication with the first controller and configured to detect an orientation of the first directional antenna and provide a first directional vector indicative thereof to the first controller;
      a first range sensor adapted to direct a first laser range finder along the first directional vector and providing a first laser rangefinder distance from a reflection from a first surface in a line of sight of said first laser range finder which is communicated to the first controller;
      a first visible light marker adapted to be oriented along the first directional vector; and
      a first display;
   wherein said second mobile structure comprises:
      a second electromagnetic radiation receiving device configured to detect the radiant energy transmission;
      a second directional antenna operably coupled to the second electromagnetic radiation receiving device;
      a second support operably coupled to the second electromagnetic radiation receiving device for orienting the second directional antenna in a direction toward the radiant energy transmission;
      a second position detector configured to detect a location of the second directional antenna relative to the reference coordinate system and output a second position data;
      a second orientation detector in communication with a second controller and configured to detect the orientation of the second directional antenna and provide a second orientation signal indicative thereof to the second controller;
      a second range sensor adapted to direct a second laser range finder along the second directional vector and providing a second laser rangefinder distance from a reflection from a second surface in a line of sight of said second laser range finder which is communicated to the second controller;
      a second visible light marker adapted to be oriented along the second directional vector; and
      a second display;
   wherein said first controller is configured to communicate said first directional vector to said second controller;
   wherein said second controller is configured to communicate said second directional vector to said first controller;
   wherein the first and second controllers each further comprise a spatial processor configured to calculate the location of the radiant energy transmission source relative to the reference coordinate system based upon said first and second location data and at least two different directional vectors comprising said first and second directional vector;
   wherein said first and second controller determine a first distance from said first location data to the location of the radiant energy transmission source and a second distance from said second location data to the location of the radiant energy transmission source;
   wherein said first controller displays a first output on said first display if the first distance and the first laser rangefinder distance match;
   wherein said second controller displays a second output on said second display if the second distance and the second laser rangefinder distance match.

2. An electromagnetic radiation source locating system as in claim 1, wherein said first and second electromagnetic radiation receiving devices that are configured to detect the radiant energy transmission respectively comprises a first and second signal processor that analyzes, interprets and determines relative strengths of the radiant energy transmission.

3. An electromagnetic radiation source location system as in claim 2, wherein at least one of said first and second signal processors further identifies and classifies the radiant energy transmission.

4. An electromagnetic radiation source location system as in claim 3, wherein the first and second signal processors each further determines the relative strength of the radiant energy transmission based on respective different orientations of the first directional antenna and second directional antenna.

5. An electromagnetic radiation source location system as in claim 4, further comprising a first and second orientation actuators respectively coupled with the first and second support, wherein the first and second controllers respectively operate the first and second orientation actuators to respectively orient the first and second directional antennas toward the radiant energy transmission based on said relative strengths of the radiant energy transmission received at the first and second mobile structure.

6. An electromagnetic radiation source location system as in claim 5, wherein the first and second orientation actuators comprise servomotors.

7. An electromagnetic radiation source location system as in claim 2, wherein said first and second signal processors identifies and classifies the radiant energy transmission based on said relative strengths of the radiant energy transmission.

8. An electromagnetic radiation source location system as in claim 7, wherein the first and second mobile structure respectively further comprising at a first and second audio system that respectively receive signal inputs from at least the first and second signal processors, wherein the first and second audio systems each outputs an audible signal based on said relative strength of the radiant energy transmission whereby the audible signal output by the audio system varies based on the strength of the radiant energy transmission.

9. An electromagnetic radiation source location system as in claim 8, wherein the first or second audio system further comprises a headphone that outputs the audible signal.

10. An electromagnetic radiation source location system as in claim 1, further comprising a first and second camera respectively coupled with the first and second mobile structure, wherein the first and second cameras are respectively coupled such that the first and second cameras move in relations to the first and second support to respectively orient their field of views along said first and second vectors, wherein the first and second displays respectively output images from the first and second cameras.

11. An electromagnetic radiation source location system as in claim 1, wherein said first and second position detectors further respectively comprise a first and second global positioning system (GPS) receiver configured to detect a respective absolute position of first and second directional antenna relative to a reference coordinate system.

12. An electromagnetic radiation source location system as in claim 11, wherein the first and second orientation detectors respectively detect angular orientation of the first and second directional antennas about their perpendicular axes relative to the reference coordinate system.

13. An electromagnetic radiation source location system as in claim 12, wherein the first and second orientation detectors respectively comprise a first and second digital compass operably coupled to the first and second support.

14. An electromagnetic radiation source location system as in claim 12, wherein the first and second orientation detectors each comprise a first and second angular or rotation sensors configured to sense at least rotational movement of the first and second directional antenna respectively relative to the first and second support.

* * * * *